2,973,346

RECOVERING HALOGENATED COPOLYMERS

Werner Albert Bauch and Merlan Meredith Lambert, Baton Rouge, La., and George Oliver Hillard, Jr., Westfield, N.J., assignors to Esso Research and Engineering Company, a corporation of Delaware No Drawing. Filed May 16, 1957, Ser. No. 659,465

9 Claims. (Cl. 260—85.3)

This invention relates to improved methods of processing, for product recovery, at a pH of between about 6.5 and 7.5, halogenated and particularly chlorinated or brominated rubbery copolymerization products of isoolefins and multiolefins, such as halogenated butyl rubber, in suspension slurried in an aqueous medium.

Halogenated butyl rubber is advantageously produced by the controlled halogenation of a solution of unvulcanized hydrocarbon rubbery copolymer. The rubbery hydrocarbon copolymer, which is produced in a reaction zone at a temperature level of between about −80° and −165° C., is in the form of a slurry suspended in about 1 to 10 volumes of a $C_1$ to $C_3$ alkyl halide diluent. This slurry is then caused to flow into a flash drum where it is contacted with a hot inert solvent such as a $C_5$ to $C_{10}$ hydrocarbon which drives off volatile materials such as the alkyl halide and dissolves the butyl rubber in the solvent. The butyl rubber is then halogenated while dissolved in the solvent, the halogenated butyl rubber-containing solution formed being subsequently contacted with steam and hot water to reslurry the resulting halogenated butyl rubber in aqueous suspension. The halogenated butyl rubber is then recovered by dewatering and degassing extrusion or the like wherein the finishing temperatures are advantageously regulated to a temperature level of between about 100° and 175° C.

Heretofore, the halogenated butyl rubber, while slurried in the aqueous medium, has normally been neutralized with an alkaline reagent such as potassium hydroxide, sodium hydroxide, calcium hydroxide, ammonium hydroxide, ammonia, or the like, the neutralized halogenated butyl rubber-containing slurry having an alkaline pH of about 7.5 up to about 8.5. However, the resulting halogenated copolymer-containing slurry foams badly at the above pH range and fouls auxiliary equipment such as condensers in the hydrocarbon solvent recovery system. It has also been attempted to omit the neutralization step or reduce the amount of alkaline reagent added so that the slurry has a definitely acidic pH of say below about 6.5 down to about 5.5. Although this completely eliminates foaming of the slurry and fouling of auxiliary equipment, the halogenated copolymer recovered is dark in color. It was believed that this dark color was unavoidable, and, where the copolymer is subsequently compounded with a carbon black and vulcanized, the fact that the color is dark is not especially disadvantageous.

Recently, it has been found that the light colored halogenated copolymers are especially useful in pastel and white sidewalls of tires because of their low migratory staining characteristics and outstanding resistance to weathering, cracking, and discoloration. It is, therefore, very desirable to produce a light colored halogenated butyl rubber which during recovery in slurry form does not cause foaming or fouling of auxiliary equipment.

According to the present invention, the foregoing difficulties are overcome and a lightt colored halogenated butyl rubber produced by regulating the pH of the halogenated copolymer-containing slurry to a level of between about 6.5 and 7.5 and preferably between about 6.7 and 7.3. The resulting slurry formed does not foam or cause fouling of auxiliary equipment and the halogenated copolymer, as recovered, may be compounded with conventional amounts of titanium dioxide or other white pigment, clays, bluing agents such as ultramarine blue, magnesium oxide and/or calcium oxide, zinc oxide and/or sulfur, other conventional curatives, plasticizer oils, waxes, resins, antioxidants, etc. to produce white colored stocks suitable for use in the sidewall area of tires. For use in pastel colored rubber products, the compounded stock formed may also contain minor proportions of such pigments as ferric hydroxide, chrome-yellow, prussian blue, phthalocyanine, etc.

Butyl rubber, is essentially a vulcanizable rubbery hydrocarbon copolymer containing about 85 to 99.5 weight percent, preferably about 95 to 99.5 weight percent of a $C_4$ to $C_8$ isoolefin such as 2-methyl-1-butene, 3-methyl-1-butene, or especially isobutylene, the remainder being a $C_4$ to $C_{14}$ multiolefin, preferably a $C_4$ to $C_6$ conjugated diolefin such as butadiene, dimethyl butadiene, piperylene, or such multiolefins as vinyl fulvenes, cyclopentadiene, cyclohexadiene, or especially isoprene. The resulting rubbery copolymer has a Staudinger molecular weight of about 20,000 to about 300,000, a mole percent unsaturation of between about 0.5 to 15.0, and an iodine number of about 0.5 to 50.0 (Wijs). The preparation of such a copolymer, known in the art as butyl rubber, is described in U.S. Patent 2,356,128 to Thomas et al. and also in other patents as well as in the literature.

In producing halogenated butyl rubber, a solution of the butyl rubber in the inert solvent is contacted at a temperature level of above 0° C. and about 100° C. with such halogenating agents as gaseous chlorine, liquid bromine, iodine chloride, or sulfuryl chloride at room temperature or with N-chlorosuccinimide; N,N' dibromo-5,5-dimethyl hydantoin or the like. The halogenation is carried out so as to make the resulting halogenated butyl rubber contain at least about 0.5 weight percent, preferably at least about 1.0 weight percent halogen but not more than a halogen content of about 3.0 "X" weight percent (in the case of bromine) and not more than a halogen content of about 1.0 "X" weight percent (in the case of chlorine) wherein:

$$X = \frac{M_3 L}{(100-L)M_1 + L(M_2 + M_3)} \times 100$$

and $L$ = mole percent of the multiolefin in the polymer
$M_1$ = molecular weight of the isoolefin
$M_2$ = molecular weight of the multiolefin
$M_3$ = atomic weight of chlorine or bromine.

Restated, the polymer should not have a halogen content exceeding about 1 atom of chlorine or 3 atoms of bromine per double bond in the polymer.

The resulting solution of halogenated butyl rubber is then advantageously contacted in a flash zone with steam and hot water. The primary function of the steam and hot water is to flash off the solvent, leaving the nonvolatile halogenated butyl rubber copolymer in the water as a slurry, the halogenated copolymer water slurry being regulated to a pH of between about 6.5 and 7.5 by the addition thereto of carefully controlled amounts of one or more of the alkaline reagents previously listed.

More particularly, in practicing the present invention, in order to produce a light colored product and avoid foaming of the slurry and fouling of auxiliary equipment, means are provided for immediately dispersing the halogenated butyl rubber copolymer leaving the halogenation step with a large body of steam and an aqueous medium containing an alkaline reagent in the amount sufficient to regulate the pH to a level of between about 6.7 and 7.3 or even more especially to about 6.8 to 7.2. The amount of alkaline reagent present is generally between about 0.005 and 0.5, preferably between about 0.01 and 0.10 part by weight per 100 parts by weight of halogenated copolymer. It is also advantageous to maintain the concentration of the alkaline reagent in the water to a level of between about 0.0001 and 0.01 weight percent, preferably between about about 0.0002 and 0.002 weight percent.

The large body of the fluid so obtained is regulated to a temperature level of between about 7° and 95° C., preferably between about 75° and 90° C. and vigorously agitated to insure efficient heat transfer, to prevent the agglomeration of rubbery copolymer particles and to effect substantially complete elimination of non-aqueous materials. The pressure in the flash zone may be maintained close to atmospheric pressure or it may be sufficiently high so that the solvent vapors may be readily condensed with the aid of cooling water without the need of gas compressors or refrigeration. The halogenated butyl rubber is then recovered by filtration, degassing extrusion, drying or the like. The resulting halogenated butyl rubber, as recovered, is light in color, i.e. has an amber to very light brown color, has a relatively low unsaturation as indicated by an iodine number of about 0.5 to 50, preferably about 1.0 to 20 and a Staudinger molecular weight of about 20,000 to about 300,000.

The details and advantages of the present invention will be better understood from a consideration of the following experimental data:

*Example*

A reactor which was indirectly cooled and maintained at about −140° F. (i.e. −95° C.) by means of boiling liquefied ethylene was charged with approximately 800 lbs. per hour of a feed containing 30 weight percent of isobutylene, 2.5 weight percent of isoprene and 67.5 weight percent of methyl chloride. Fifty-one pounds per hour of a solution of an aluminum chloride catalyst in methyl chloride were supplied to the reactor. The AlCl$_3$ solution was added under 110 p.s.i.g. pressure to the body of the cold olefinic mixture which was being rapidly stirred. The copolymerization reaction began immediately and proceeded to a conversion of about 75% of the olefinic materials into copolymer; the yield of copolymer being approximately 167 lbs. per hour. The cold methyl chloride-butyl rubber slurry formed in the reactor was then continuously overflowed at a rate of about 870 lbs. per hour into a flash drum where it was contacted with 1530 lbs. of an AlCl$_3$ treated narrow cut hexane. The flash drum was regulated to a temperature of about 25° to 70° C. (e.g. about 50° C.) so as to flash overhead substantially all of the methyl chloride and unreacted monomers and form a solution of butyl rubber in hexane. This solution was continuously fed to a 500 gallon glass lined Pfaudler reactor equipped with an agitator, baffle, submerged stainless steel sparger ring and a conduit leading into the ring.

Gaseous chlorine was then continuously added to the butyl rubber solution over a period of ½ hour at a temperature level of 29° C. and under atmospheric pressure. The chlorine was added to the reactor through the conduit via the sparger ring which, as hereinbefore mentioned, was immersed below the liquid level of the agitated butyl rubber solution. The chlorination was then terminated and the solution containing the chlorinated butyl rubber formed, agitated for an additional 10 minutes. The resulting solution of chlorinated butyl rubber was then water washed three times to remove dissolved hydrogen chloride. There was then added to the solution, 0.2 lbs. per 100 lbs. of chlorinated butyl rubber as a 10 weight percent solution in hexane of antioxidant 2,6-ditertiary butyl para cresol.

The resulting water washed solution containing the chlorinated butyl rubber product, was then recovered by injecting the dissolved chlorinated polymer through a suitable nozzle into a flash drum along with sufficient steam having a temperature of about 300° F. and a pressure of 60 p.s.i.g. to maintain a vapor temperature of 190° F. in the flash drum. Also continuously injected, according to the present invention, was about 135 lbs. per minute of hot water having a temperature of 190° F. to 210° F. (i.e. 88° to 99° C.) and containing about 0.001 weight percent of sodium hydroxide, i.e. just sufficient sodium hydroxide to bring the slurry to a pH of 7.0. The hexane solvent was thereby flashed off and an aqueous slurry of the chlorinated butyl rubber in water having a pH of 7.0 formed.

The chlorinated butyl rubber slurry did not tend to foam and was readily processed by pumping through various auxiliary equipment. No fouling of the hydrocarbon solvent condenser was noted. The water content in the chlorinated butyl rubber was then reduced 50 weight percent by separation on a vibrating screen. The chlorinated butyl rubber polymer, which was then in the form of a "wet crumb," was then fed to a dewatering extruder regulated to a temperature of 210° F. wherein the water content was reduced to 5.0 wt. percent based on chlorinated butyl rubber. The polymer was then fed to a degassing extruder maintained at 290 °F. wherein the water content was reduced to 0.3 weight percent. The dried chlorinated butyl rubber was amber in color and suitable for use in light colored vulcanizates, the Mooney viscosity (8 minutes at 212° F.) being 64. The chlorinated butyl rubber was also found to contain 1.30 weight percent combined chlorine. Upon subsequent compounding of 100 parts by weight of the halogenated copolymer with 30 parts by weight of titanium dioxide, 10 parts by weight of magnesium oxide, 5.0 parts by weight of zinc oxide, 2.0 parts by weight of tetramethyl thiuram disulfide, and 1.0 part by weight of stearic acid, and curing for 60 minutes at 307° F., a white colored vulcanizate was formed having a tensile strength in excess of 1,000 p.s.i.

Upon repeating the above experiment, but regulating the pH of the aqueous slurry to either 6.2 or 7.8, a dark chocolate-to-black color, unsatisfactory for use in light colored vulcanizates, was obtained in the first instance; whereas in the second instance severe foaming of the aqueous slurry occurred with resultant fouling of solvent recovery equipment.

Resort may be had to various modifications and variations of the disclosed embodiments without departing from the spirit of the invention or the scope of the appended claims.

What is claimed is:

1. In a process for manufacturing a halogenated rubbery copolymer of 85 to 99.5 weight percent of a $C_4$ to $C_8$ isoolefin and 0.5 to 15 weight percent of a $C_4$ to $C_{14}$ multiolefin in which the halogenated copolymer is subsequent to halogenation slurried with an aqueous medium of steam and water and an inorganic alkaline material to neutralize the slurry, the improvement which comprises utilizing the inorganic alkaline material in an amount controlled to fall in the range of from 0.005 to 0.5 part by weight per 100 parts of copolymer so as to regulate the slurry formed to a pH of between about 6.5 and 7.5.

2. A process according to claim 1 in which the alkaline material is present in an amount of between about 0.01 and 0.10 weight percent based on halogenated copolymer.

3. A process according to claim 1 in which the alkaline material comprises ammonium hydroxide.

4. A process according to claim 1 in which the halogenated copolymer contains chlorine.

5. A process according to claim 1 in which the halogenated copolymer contains bromine.

6. A process according to claim 1 in which the alkaline material comprises the hydroxide of a metal selected from the group consisting of sodium, calcium and potassium.

7. In a process of manufacturing a halogenated copolymer of about 85 to 99.5 weight percent of a $C_4$ to $C_8$ isoolefin and about 15 to 0.5 weight percent of a $C_4$ to $C_8$ conjugated diolefin, the combination which comprises discharging said halogenated copolymer dissolved in an inert solvent having a boiling point below that of water, into a flashing zone, and introducing into said zone a slurrying amount of an aqueous medium of steam and water the improvement which comprises utilizing in the aqueous medium an inorganic alkaline material in an amount of from 0.005 to 0.5 part by weight per 100 parts of copolymer thereby regulating the slurry formed to a pH of between about 6.7 and 7.3.

8. A process according to claim 7 in which the pH is regulated to between about 6.8 and 7.2 by the addition to the slurry of an alkaline reagent.

9. A process according to claim 8 in which the alkaline reagent is present in an amount of between about 0.01 and 0.10 weight percent based on halogenated copolymer.

References Cited in the file of this patent

UNITED STATES PATENTS

| | | |
|---|---|---|
| 2,092,295 | Van Peski et al. | Sept. 7, 1937 |
| 2,394,266 | Soday | Feb. 5, 1946 |
| 2,463,866 | Green | Mar. 8, 1949 |
| 2,631,984 | Crawford et al. | Mar. 17, 1953 |

OTHER REFERENCES

Whitby: "Synthetic Rubber," 1954, pages 617–627.